United States Patent [19]

Beall et al.

[11] Patent Number: 4,666,867
[45] Date of Patent: May 19, 1987

[54] HYDROGEN-CONTAINING GLASS MICROFOAMS AND GAS-CERAMICS

[75] Inventors: George H. Beall, Big Flats; John F. MacDowell, Painted Post, both of N.Y.

[73] Assignee: Corning Glass Works, Corning, N.Y.

[21] Appl. No.: 897,514

[22] Filed: Aug. 18, 1986

Related U.S. Application Data

[63] Continuation-in-part of Ser. No. 737,205, May 23, 1985, abandoned.

[51] Int. Cl.⁴ .................. C03C 10/04; C03C 11/00; C03C 3/097; C03C 3/091
[52] U.S. Cl. .............................. 501/5; 501/8; 501/10; 501/39; 501/63; 501/66; 501/67; 501/77; 501/79
[58] Field of Search ............... 501/5, 8, 10, 39, 63, 501/66, 67, 77, 79

[56] References Cited

U.S. PATENT DOCUMENTS

| | | | |
|---|---|---|---|
| 1,108,007 | 8/1914 | Ribbe | 501/81 |
| 2,978,340 | 4/1961 | Veatch et al. | 106/75 |
| 3,189,512 | 6/1965 | Stong | 501/85 |
| 3,261,696 | 7/1966 | Weigert et al. | 501/84 |
| 3,634,111 | 1/1972 | Foster | 501/39 |
| 3,811,852 | 5/1974 | Bowdareu et al. | 65/33 |
| 4,011,093 | 3/1977 | Veres | 501/39 |
| 4,084,980 | 4/1978 | Motoki | 106/75 |
| 4,116,703 | 9/1978 | Stempin et al. | 106/75 |
| 4,133,691 | 1/1979 | Kindt et al. | 106/75 |
| 4,257,798 | 3/1981 | Hendricks et al. | 501/39 |
| 4,404,291 | 9/1983 | Kiefer et al. | 501/81 |
| 4,547,233 | 10/1985 | Delzant | 501/33 |

*Primary Examiner*—Mark L. Bell
*Attorney, Agent, or Firm*—C. S. Janes, Jr.

[57] ABSTRACT

The present invention is concerned with the preparation of glass microfoams and gas-ceramics having compositions selected from the systems of $SiO_2$—$Al_2O_3$—$B_2O_3$—RO—$R_2O$, $SiO_2$—$Al_2O_3(B_2O_3)$—$P_2O_5$—$Li_2O$—[$ZrO_2(TiO_2)$], and $SiO_2$—$P_2O_5$—$B_2O_3$—[RO], wherein RO is selected from the group of MgO, CaO, SrO, BaO, and ZnO, and $R_2O$ is selected from the group of alkali metal oxides. The foams comprise hydrogen-containing cells produced through the inclusion in the batch of a hydrogen-generating agent selected from the group of ammonium salts and/or a combination of amines and/or carbohydrates and/or hydrocarbons with phosphates.

12 Claims, No Drawings

HYDROGEN-CONTAINING GLASS MICROFOAMS AND GAS-CERAMICS

This application is a continuation-in-part application of Ser. No. 737,205, filed May 23, 1985, now abandoned.

BACKGROUND OF THE INVENTION

Gas evolution from glasses has been studied both from th standpoints of refining of glass and the creation of glass foams. As an example of a glass foam, a commercial material marketed under the trademark FOAMGLAS by Pittsburgh-Corning, Pittsburgh, Pa. is produced in large volume by melting a typical soda-lime glass under highly oxidizing conditions (utilizing $Na_2SO_4$ in the batch), comminuting the glass to a fine particle size, and firing the glass particles in combination with powdered carbon. A coarse foamed glass of low density ($<0.2$ g/cm$^3$) is formed containing carbon dioxide bubbles of several millimeters' diameter. The glass is gray or black in color with a porous and dull surface.

Porous glasses, glass-ceramics, and sintered ceramics have frequently been described in the patent literature. Examples of such disclosures include:

U.S. Pat. No. 1,108,007 is directed to the melting of basalt in graphite crucibles. The molten basalt reacts with the graphite and bubbles of a gas (not identified) are entrained in the melt. Upon cooling, the melt crystallizes to a porous body.

U.S. Pat. No. 2,978,340 is concerned with the preparation of hollow glass spheres from discrete, solid particles consisting of an alkali metal silicate, e.g., sodium silicate, a metal oxide which forms an insoluble glass when melted with the silicate, e.g., $B_2O_3$, and a bloating agent. An extensive list of gasifying agents is furnished, none of which is singled out as exhibiting any unusual behavior.

U.S. Pat. No. 3,189,512 is drawn to foamable ceramic cements wherein a combination of SiC and $SO_3$ comprised the foaming agent. The cements were composed of PbO, a metal fluoride, SiC, $SO_3$, and a lithium aluminosilicate material (conveniently petalite).

U.S. Pat. No. 3,261,696 reports a method for forming insulating foamed materials comprising the steps of: (a) combining $ZrO_2$, $Al_2O_3$, and powdered aluminum; (b) adding $H_3PO_4$ to the mixture to cause a reaction to occur which liberates water vapor and hydrogen to foam the mass; and (c) curing the mass at 150°–800° F.

U.S. Pat. No. 3,634,111 discusses foamable ceramic cements. The cements consisted of a glass having a composition within the $Li_2O$—$Al_2O_3$—$SiO_2$—$TiO_2$ system containing SiC as the cellulating agent, and being essentially free from PbO, $SO_3$, and fluoride.

U.S. Pat. No. 3,811,852 discloses the preparation of porous glass-ceramic masses comprising the steps of frothing the initial glass melt with gas liberated through fuel combustion in the melt, forming glass ribbon from the melt, and thereafter heat treating the glass ribbon in a two-step process to convert the glass into a glass-ceramic.

U.S. Pat. No. 4,011,093 describes a foamable ceramic cement consisting essentially of a glass frit having a composition within the $Li_2O$—$Al_2O_3$—$CeO_2$—$SiO_2$ system with, optionally, ZnO into which SiC is incorporated as a foaming agent.

U.S. Pat. No. 4,084,980 is drawn to the production of a foamed body comprising the steps of: (a) mixing the following four components, viz., an aqueous solution of an acid or a water soluble acidic phosphate, a cement material or an anhydrous alkali metal silicate, a metal blowing agent, and a foaming stabilizer, to obtain a pasty mass; (b) shaping the pasty mass into a desired geometry; and (c) allowing the shaped mass to stand to effect foaming.

U.S. Pat. No. 4,116,703 is directed to the preparation of a foamable cement which comprises mixing together crystalline hydraulic cement, a hydraulic cement in the form of a silicate glass powder, and quaternary ammonium silicate, and then allowing the mixture to react and set at a temperature below 150° C.

U.S. Pat. No. 4,133,691 is concerned with the development of an inorganic foam which comprises the steps of: (a) mixing particulate aluminum with an aqueous solution of an alkali metal base to cause the formation of hydrogen gas; (b) folding that mixture into an aqueous alkali metal silicate solution in a manner to retain concentrated areas of the mixture in the silicate solution; and (c) thoroughly mixing the materials to form a solid foam.

U.S. Pat. No. 4,404,291 reports a method for forming a molded sintered porous body comprising the following steps: (a) mixing a powdered organic combustible material with powdered glass, devitrifying solder glass, or glass-ceramic; (b) heating the mixture to a temperature sufficient to burn off the organic material to form open pores in the resultant mass; and then (c) heating the mass to a temperature sufficient to sinter the powders together into an integral body.

As can be observed from the above, various mechanisms have been employed to prepare foamed glass and glass-ceramic bodies. Nevertheless, the production of foamed glasses and glass-ceramics exhibiting the highly desirable combination of fine bubble size, low density, and a non-porous surface has not been satisfactorily achieved. Hence, the primary objective of the present invention is to provide such products. cl SUMMARY OF THE INVENTION The basis of the instant invention is the finding that foamed, closed-pore glass and glass-ceramic articles, wherein very fine bubbles composed predominantly of hydrogen are present, can be formed over a range of compositions in the following fundamental systems; viz., $SiO_2$—$Al_2O_3$—$B_2O_3$—RO—$R_2O$, $P_2O_5$—$SiO_2$—$B_2O_3$—[RO], and $SiO_2$—$Al_2O_3(B_2O_3)$—$P_2O_5$—$Li_2O$—$[ZrO_2(TiO_2)]$, wherein RO is selected from the group of MgO, CaO, SrO, BaO, and ZnO, and $R_2O$ is selected from the group of alkali metal oxides, conveniently $Li_2O$, $Na_2O$, and/or $K_2O$. Ammonium salts constitute the preferred source of hydrogen, although similar effects can be obtained in certain compositions through a combination of carbohydrates, hydrocarbons, and amines with phosphates.

As used herein, the term gas-ceramic indicates a body formed by a process wherein foaming concurrently accompanies crystallization; glass microfoam designates a body formed by a process wherein foaming is generated without crystallization. Gas-ceramics can be produced either through foaming by controlled nucleation of bubbles upon heat treatment of a precursor glass body or by spontaneous nucleation upon cooling of a molten glass to a solid body.

In a general composition survey of the three operable systems, three limitations appear to be unqualifiedly mandatory; viz., at least 8% by weight $SiO_2$, at least 30% by weight $B_2O_3+Al_2O_3+P_2O_5$, and at least 10% by weight $B_2O_3+P_2O_5$. Although both $B_2O_3$ and $P_2O_5$ are desirable in combination in all composition systems, neither alone is absolutely necessary. Furthermore, all the compositions appear to be "acid"; i.e., $SiO_2+B_2O_3+Al_2O_3+P_2O_5 \gg RO+R_2O$, and $B_2O_3+Al_2O_3+P_2O_5 > RO+R_2O$. Fluorides appear to be undesirable, as are most easily reducible metal oxides, although sometimes minor amounts of $TiO_2$ and rather considerable levels of ZnO can be tolerated.

The most effective batch ingredients for the introduction of hydrogen-forming species include $NH_4H_2PO_4$, $(NH_4)_2HPO_4$, $NH_4Cl$, $NH_4B_4O_7$, and starch and/or sugar with $Al(PO_3)_3$. Concentrations of those materials ranging from 0.5 to over 50% of the total batch have been found effective, depending upon the base glass composition.

Foaming of the samples was accomplished by heating at about 700°–1000° C., depending upon the base compositions thereof, for times ranging from about 10 minutes to several hours.

The hydrogen-containing cells or bubbles are believed to be the result of either the brakdown of ammonium species in the glass, followed by dissolution of hydrogen molecules in the glass at high temperatures and subsequent release at low temperatures, or by the reduction of stable $OH^-$ ions in the glass network through reaction with a reduced phosphorus species such as $P^{+3}$ or P in the glass.

$SiO_2$—$Al_2O_3$—$B_2O_3$—RO—$R_2O$ System

Operable compositions in this system, expressed in terms of weight percent on the oxide basis, consist essentially of 25–65% $SiO_2$, 15–35% $Al_2O_3$, 12–35% $B_2O_3$, and 1.5–20% $RO+R_2O$, consisting of 0–15% RO (alkaline earth oxides and/or ZnO) and 0–20% $R_2O$ (alkali metal oxides). The level of $Al_2O_3$ in terms of mole percent is maintained higher than the sum of $RO+R_2O$. The inclusion of 0.5–10% $P_2O_5$ is desirable but not mandatory.

A heat treatment in the vicinity of 800° C. is generally effective in developing gaseous hydrogen in this system, although temperatures over the range of 700°–950° C. can be operable. Mullite ($3Al_2O_3.2SiO_2$) and sometimes anorthite solid solution $[(Ca,Sr).Al_2O_3.2SiO_2]$ and $AlPO_4$ have been identified through x-ray diffraction analysis. The preferred alkaline earth oxide is CaO, since its presence favors the generation of small bubbles. CaO-containing, aluminosilicate glasses have been recognized as exhibiting high resistance to gas permeation and low ionic mobility, this latter phenomenon resulting in glasses of high electrical resistivity. Because it has been postulated that the rate of hydrogen diffusion controls the rate of bubble growth and the size of the bubbles, glasses demonstrating low permeability to gases have been deemed to be preferred.

The products of this composition system combine a dense glassy skin of good chemical durability with densities typically in the range of about 0.9–2.0 g/cm³. The dimensions of the bubbles generally vary from about 50 microns to 1 mm. With the inclusion of low concentrations of Pd, however, which acts as a nucleating agent in amounts of 0.001–0.01% by weight, bubbles having diameters down to 20 microns have been observed.

$SiO_2$—$Al_2O_3(B_2O_3)$—$P_2O_5$—$Li_2O$—$[ZrO_2(TiO_2)]$ System

The compositions of this system normally crystallize to a substantial degree, the major crystal phase being identified as a $\beta$-quartz solid solution having the general formula $$nSiO_2.xLiAlO_2.yAlPO_4$$

wherein $n > x+y$. Although the inclusion of $B_2O_3$ appears to increase the proportion of glassy phase after crystallization, it has been conjectured that some $BPO_4$ enters into the quartz structure in place of silica.

The principal components of the system comprise $SiO_2$, $Al_2O_3$, $P_2O_5$, $Li_2O$, and $ZrO_2$ in the amounts recorded below, expressed in terms of weight percent on the oxide basis, with $TiO_2$ being capable of replacing at least part of the $ZrO_2$ as a nucleating agent. Total replacement of $ZrO_2$ with $TiO_2$, however, appears to yield products cointaining coarse blisters.

| $SiO_2$ | 40–50 | $ZrO_2$ | 0–10 |
|---|---|---|---|
| $Al_2O_3$ | 15–35 | $B_2O_3$ | 0–15 |
| $P_2O_5$ | 10–25 | $TiO_2$ | 0–5 |
| $Li_2O$ | 1–7 | | |

Ammonium acid phosphate or aluminum metaphosphate combined with starch comprises the preferred hydrogen-gnerating batch materials. The principal advantages of the gas-ceramics derived from this composition system are two; viz., the potential for materials exhibiting very low coefficients of thermal expansion arising from the presence of the $\beta$-quartz solid solution phase, and substantial mechanical strength due to the high crystallinity of the bodies. Heat treatments between about 775°–1000° C. are generally satisfactory to secure the desired high crystallinity. The bubble sizes typically vary over the range of about 0.5–5 mm.

$SiO_2$—$B_2O_3$—$P_2O_5$—[RO] System

This pseudobinary system, in which $SiO_2$ and $BPO_4$ are the major glass forming constituents, yields the most uniform glass microfoams with bubbles of the smallest dimensions. Very smooth and uniform solid glass skins encase the foamed articles, the thickness of such skins being variable according to the body composition. Hence, cell diameters range about 1–100 microns, with preferred foams having 5–20 micron cells. The densities of the products average about 1.0 g/cm³.

Operable compositions, expressed in terms of weight percent on the oxide basis, consist essentially of 10–65% $SiO_2$, 5–20% $B_2O_3$, and 15–60% $P_2O_5$, with a narrower composition area being defined in terms of 40–60% $SiO_2$, 7–20% $B_2O_3$, and 20–35% $P_2O_5$. In order to insure the production of uniform foams with glassy skins, an alkaline earth oxide and/or ZnO (RO) may desirably be added. Thus, the lowest density foams have contained about 0–20% MgO, 0–20% CaO, and 0–15% ZnO. It has been hypothesized that those additions prevent restriction of cell expansion resulting from the crystallization of $BPO_4$, and enable the generation of a very fine uniform cell size and the formation of a smooth, glassy, monolithic skin on the foam bodies. Ammonium acid phosphate is the preferred batch ingredient for both hydrogen generation and as the source of $P_2O_5$. It has been observed that compositions containing >13% MgO and/or ZnO tend to foam spontaneously upon cooling, either as poured into a glass body or after the glass body has been placed into an annealer. It has also been observed, however, that MgO and CaO additions greater than about 5% and ZnO additions greater than about 10% may result in the body exhibiting a measure of hygroscopic behavior or poor chemical durability. Therefore, from a practical point of view, the total of MgO+CaO+ZnO will be limited to 0.5–10%, consisting of 0–5% MgO, 0–5% CaO, and 0–10% ZnO.

The preferred compositions in this system crystallize only partially (customarily <50% by volume) during foaming, thereby permitting foam cell expansion. Where crystallization does occur (750°–950° C.), the principal phases are BPO$_4$, exhibiting a $\beta$-cristobalite structure, and/or magnesium pyrophosphate, Mg$_2$P$_2$O$_7$.

The chemical durability of BPO$_4$-containing glass systems is typically quite poor, but can be improved dramatically by: (a) increasing SiO$_2$ above 40% by weight; (b) reducing B$_2$O$_3$ below 10% by weight; (c) reducing modifier additions to less than 5% by weight; and/or (d) adding Al$_2$O$_3$ up to 10% by weight.

Structure and Properties of the Inventive Products

Several analyses of the bubbles occurring in the three composition systems were conducted utilizing mass spectrometry. Hydrogen always constituted the predominant species. Nitrogen was usually present to some extent, occasionally appearing as air contamination (with the normal ratio of argon), but often as primary nitrogen, i.e., without argon, presumably resulting from NH$_3$ breakdown.

The effects of varying the thermal treatment on the generation of hydrogen bubbles are generally dissimilar to those observed in conventional glass-ceramics. For example, whereas it is normally beneficial to optimize nucleation at high viscosities and low crystal growth rates with a "nucleation hold", the rate of bubble nucleation at high viscosities does not appear optimum. Thus, better nucleation is often achieved at higher temperatures where the glass readily deforms; viz., at least 200° C. above the glass transition temperature.

Furthermore, there seems to be no clear relationship between the crystallization event and the formation of hydrogen bubbles. To illustrate, in the mullite system (SiO$_2$—Al$_2$O$_3$—B$_2$O$_3$—RO—R$_2$O) foaming appears to accompany crystallization in most compositions, but generally precedes crystallization in the other two systems. Even in the high alumina compositions, bubble nucleation appears geometrically unrelated to that of mullite crystallization, with bubble nuclei occurring widely separated by about 100 microns and mullite crystals separated by less than 0.1 micron. In fact, palladium has a far greater effect upon hydrogen nucleation rates than does mullite. Hence, less than 0.01% by weight Pd can increase hydrogen nucleation rates by over an order of magnitude in the high alumina glasses.

The hydrogen bubbles are generally spherical in shape and produce a closed pore foam. As the volume percent of gas increase, the bubbles begin to impinge, thereby producing flat glassy regions separating bubbles. Customarily, the volume percent of gas does not exceed about 75%. Smaller bubbles are frequently nucleated in the glassy region between large bubbles, thereby indicating that nucleation continues during bubble growth.

The size of the bubbles is dependent upon the rate of nucleation, that rate appearing to be most rapid in the alkaline earth borosilicophosphate system and slowest in the $\beta$-quartz gas-ceramic system. The average bubble diameter in low density foams ranges from about 10 microns in Mg-Zn borosilicophosphates to several millimeters in the $\beta$-quartz system. Bubbles of smaller size (~1 micron) can be observed during the early stage of bubble generation, but the volume percent of gas in the bodies is quite small at that time.

A unique and useful characteristic of the inventive foams is the glossy dense skin which is maintained during bubble generation. It appears that the bubbles do not nucleate or grow within the surface of the bodies. This phenomenon is believed to be due to hydrogen diffusing out from the surface which causes a depleted layer where bubbles cannot form. The thickness of this hydrogen-depleted layer is variable and can range up to 1 mm.

This dense skin imparts several advantages to these foams. First, it provides relatively higher strength to the body because no bubbles penetrate the surface to create large flaws. Second, it permits the surface to be cleaned easily and creates a barrier to penetration by foreign particles. Third, the aesthetic appearance of the inventive materials is far superior to those of standard commercial foam glasses. Fourth, increased strength through thermal tempering may be imparted.

It will be appreciated that the extent of bubble development is affected by ambient pressure. For example, when a material that would normally generate a gas-ceramic containing very small cells and exhibiting a density greater than 1 g/cm$^3$ upon heating under one atmosphere pressure was heated in a vacuum furnace, a coarse foam of very low density, i.e., less than 0.5 cm$^3$ was produced. Conversely, when a small glass slab was heated between glass-ceramic plates with excess pressure being applied by stacking refractory bricks upon the upper glass-ceramic plate, the resulting foam had a higher than normal density and the bubbles were elongated parallel to the plates, i.e., in the minimum stress direction. Furthermore, the specimen, itself, was substantially elongated in the same direction and the surface thereof took on the characteristics of the surfaces of the plates. Quite unexpectedly, no adhesion persisted between the foam body and the plates after cooling. The above activity clearly demonstrates that the inventive gas-ceramics and glass microfoams may be reshaped, reformed, and embossed during thermal treatment without loss of the dense surface layer.

The phenomenon of photosensitive behavior was observed in foams of the borophosphosilicate composition system. After hydrogen generation, the foam bodies typically exhibit a white coloration, but, after being exposed to the radiation from laboratory fluorescent lamps for a few hours, the surfaces of the bodies take on a distinct pink, orange, or brownish hue. Exposure to direct sunlight produces a more neutral gray coloration in the surface. The glass bodies before hydrogen generation manifest no photosensitive effects.

The development of the pink-orange hue has also been observed when the glasses are undertreated, i.e., heated at temperatures below those at which the best foaming occurs. Also, it has been observed that the color can be bleached out of the surface by heating the bodies above about 500° C. for a few minutes.

The color of the original glasses in the three composition systems ranges from colorless through gray or brown to black. In the mullite system the color depends upon the presence of P$_2$O$_5$ and ammonium salts. Where NH$_4$Cl constitutes the sole ammonium salt in the glass batch, the original glasses are commonly light brown or salmon colored. When ammonium phosphate is present, the glasses are dark brown or black. Upon generation of hydrogen bubbles, those glasses generally become white and opaque. The opacity is deemed to be due to light scattering by the bubbles, but the change in color from dark to white is not fully understood but is believed to represent the oxidation of reduced phosphorus ions as hydrogen is generated.

In the $Li_2O$-containing, higher phosphate, $\beta$-quartz gas-ceramics, the original glasses are yellow to brown, or, if $TiO_2$ is present, dark blue to black. The foamed bodies are commonly gray-white or blue, again with a general lightening of color.

In contrast, the borophosphosilicate original glasses are clear or pale blue or violet, but can darken to a brown or pink-orange color upon hydrogen generation. When fully foamed at the upper end of the heat treating temperatures, however, the foamed bodies typically tend to become white, as previously described.

Because of the glassy and non-porous skin characteristic of hydrogen glass microfoams, the inventive products are much stronger than the standard commercial foam glasses. For example, abraded modulus of rupture values have been measured on typical mullite gas-ceramics with a density of about 1.3 g/cm$^3$ averaging about 4500 psi. Borophosphosilicate glass microfoams of the smallest cell size (10 micron cell diameter and about 1 g/cm$^3$ density), exhibit moduli of rupture averaging about 2500 psi.

A wide variety of thermal expansion characteristics can be found in the inventive gas-ceramic systems. To illustrate, gas-ceramics containing mullite and $AlPO_4$ generally exhibit coefficients of thermal expansion (0°-300° C.) between about $40-90 \times 10^{-7}$/°C.; $\beta$-quartz solid solution gas-ceramics can demonstrate coefficients as low as $10 \times 10^{-7}$/°C.; and the smallest bubble foams in the alkaline earth borophosphosilicate system display coefficients over the $40-50 \times 10^{-7}$/°C. interval, a good match for silicon metal.

Because of the inclusion of $P_2O_5$ and/or $B_2O_3$ in a number of the compositions, the refractoriness thereof is not very high. Thus, the top use temperature of the products with no thermal distortion will range about 450°-900° C.

Exceptional dielectric properties have been measured on the inventive products prepared from non-alkali metal compositions in both the $SiO_2$—$Al_2O_3$—$B_2O_3$—CaO and $P_2O_5$—$SiO_2$—$B_2O_3$—MgO systems. Very low dielectric constants, low loss tangents, and high electrical resistivities are quite prevalent. For example, a dielectric constant of 2.6 at 25° C. and 100 KHz with a corresponding loss tangent of 0.01 was measured on a mullite gas-ceramic, and a dielectric constant ranging from 2.21-2.27 and a loss tangent ranging from 0.000-0.002 over an interval of temperatures (25°-200° C.) and frequencies (100-10$^5$ Hz) were measured on a borophosphosilicate glass microfoam. Inasmuch as those products exhibit thermal expansions closely tracking alumina and silicon, their potential for electronic packaging is clear.

In like manner to the circumstances present in many conventional glass and glass-ceramics containing substantial quantities of $B_2O_3$ and/or $P_2O_5$, the silicophosphate foams containing $B_2O_3$ demonstrate poor chemical durability. However, additions of $Al_2O_3$ or an increase in $SiO_2$ appear to significantly improve the resistance to chemical attack, as does the crystallization of $BPO_4$ and/or $Mg_2P_2O_7$ therein which leaves a siliceous continuous glassy phase.

In the mullite-containing gas-ceramics with little or no $P_2O_5$, and $Al_2O_3$ present in amounts greater than 20% by weight, the chemical durability is quite good. The resistance to chemical attack exhibited by the $\beta$-quartz solid solution-containing materials can also be quite good.

Related Application

U.S. application Ser. No. 737,204, filed concurrently with the predecessor of the instant application, now U.S. Pat. No. 4,576,920, discloses the preparation of conventional glass-ceramic bodies having compositions within the system $B_2O_3$—$P_2O_5$—$SiO_2$.

DESCRIPTION OF PREFERRED EMBODIMENTS

Table I records a number of batched glass compositions, expressed in terms of parts by weight on the oxide basis, illustrating the compositional parameters of the inventive products encompassed within the $SiO_2$—$Al_2O_3$—$B_2O_3$—RO—$R_2O$ system. Because the sum of the individual constituents totals or closely approximates 100, for all practical purposes the figure tabulated for each component can be considered to indicate percent by weight. Other than the hydrogen-forming ingredients, which are tabulated in excess of the base composition, the actual batch constituents may comprise any materials, either oxides or other compounds, which, when melted together, will be converted into the desired oxides in the proper proportions. It will be appreciated that volatile species like $NH_3$ do not fully remain in the glass.

The batches were compounded, ballmilled to aid in securing a homogeneous melt, and charged into silica crucibles. The crucibles were covered, introduced into a furnace operating at about 1400°-1600° C., and the batches melted for about 2-4 hours. The melts were cast into glass slabs having dimensions of about 8"×4"×0.375", and those slabs were annealed overnight at about 500°-700° C.

TABLE I

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 60.0 | 58.3 | 35.0 | 37.0 | 37.0 | 40.0 | 35.0 | 40.0 | 37.5 | 40.0 | 38.0 | 37.0 |
| $Al_2O_3$ | 20.0 | 20.1 | 25.0 | 25.0 | 25.0 | 25.0 | 25.0 | 30.0 | 25.0 | 25.0 | 26.0 | 27.0 |
| $B_2O_3$ | 17.5 | 19.1 | 25.0 | 25.0 | 25.0 | 30.0 | 25.0 | 30.0 | 30.0 | 28.0 | 28.0 | 28.0 |
| $Li_2O$ | — | — | — | — | — | 5.0 | — | 5.0 | 2.0 | 2.0 | — | — |
| $Na_2O$ | 2.5 | 2.5 | — | — | — | — | — | — | — | — | 2.0 | 2.0 |
| $K_2O$ | — | — | 15.0 | 13.0 | 13.0 | — | 15.0 | — |  |  |  |  |
| $NH_4Cl$ | 1.0 | 1.0 | 2.5 | — | 0.5 | 0.5 | 0.5 | 0.5 | 0.5 | 0.5 | 0.5 | 0.5 |
| $(NH_4)_2HPO_4$ | — | — | — | 1.0 | 1.0 | 1.0 | 1.0 | 1.0 | 1.0 | 1.0 | — | — |
| $Cr_2O_3$ | 0.05 | — | — | — | — | — | — | — |  |  |  |  |
| F | — | 1.0 | — | — | — | — | — | — |  |  |  |  |
| Pd | — | — | — | — | — | — | 0.0006 | 0.0006 | .0006 | .0006 | .0006 | .0006 |
| CaO |  |  |  |  |  |  |  |  | 5.5 | 5.0 | 5.0 | 5.0 |
| $NH_4H_2PO_4$ |  |  |  |  |  |  |  |  | — | — | 2.0 | 4.0 |

TABLE I-continued

| | | | | |
|---|---|---|---|---|
| BaO | — | — | — | — |
| $P_2O_5$ | — | — | — | — |
| Starch | | | | |
| $NH_3$ | | | | |
| Cl | | | | |

| | 13 | 14 | 15 | 16 | 17 | 18 | 19 | 20 | 21 | 22 | 23 | 24 |
|---|---|---|---|---|---|---|---|---|---|---|---|---|
| $SiO_2$ | 31.0 | 39.0 | 37.5 | 40.0 | 40.0 | 38.0 | 40.0 | 40.0 | 35.0 | 38.0 | 40.0 | 33.0 |
| $Al_2O_3$ | 26.0 | 27.0 | 27.0 | 25.0 | 25.0 | 25.0 | 25.0 | 25.0 | 20.0 | 25.0 | 25.0 | 24.0 |
| $B_2O_3$ | 30.0 | 28.0 | 28.0 | 15.0 | 15.0 | 17.0 | 15.0 | 20.0 | 20.0 | 17.0 | 15.0 | 16.0 |
| $Li_2O$ | — | 1.0 | — | — | | | | | | | | |
| $Na_2O$ | — | 1.5 | — | — | | | | | | | | |
| $K_2O$ | | | | | | | | | | | | |
| $NH_4Cl$ | 0.7 | 0.5 | 0.5 | 0.5 | | | | | | | | |
| $(NH_4)_2HPO_4$ | — | — | — | — | | | | | | | | |
| $Cr_2O_3$ | | | | | | | | | | | | |
| F | | | | | | | | | | | | |
| Pd | .0006 | .0006 | .0006 | .0006 | — | 0.01 | 0.003 | 0.001 | 0.001 | 0.001 | — | 0.0006 |
| CaO | 5.0 | 3.5 | 7.5 | 10.0 | 10.0 | 10.0 | — | — | — | — | 10.0 | 10.0 |
| $NH_4H_2PO_4$ | 1.5 | 10.0 | 8.0 | — | | | | | | | | |
| BaO | 8.0 | — | — | — | — | — | — | — | — | — | — | 12.0 |
| $P_2O_5$ | — | — | — | 10.0 | 10.0 | 10.0 | 10.0 | 10.0 | 10.0 | 10.0 | 10.0 | 5.0 |
| Starch | | | | | 1.0 | — | — | — | — | — | — | — |
| $NH_3$ | | | | — | 1.4 | 1.5 | 0.7 | 1.5 | 1.5 | 0.5 | 1.0 | |
| Cl | | | | — | 0.33 | 0.33 | 0.33 | 0.33 | 0.33 | — | 0.5 | |

Specimens of suitable geometry for use in conducting tests for various physical and chemical properties were cut from the slabs and those specimens placed inside an electrically-heated furnace. Although more rapid or slower heating rates can be employed, as a matter of convenience the temperature within the furnace was raised as a rate of about 5° C./minute to the foaming temperature recited in Table II, and that temperature maintained for the period of time listed in Table II. Likewise, whereas faster or slower rates of cooling the foamed bodies to room temperature can be operable, as a matter of convenience the electric power to the furnace was merely cut off and the furnace permitted to cool with the bodies retained therewithin. This cooling practice has been termed "cooling at furnace rate" and averages about 2°–3° C./minute.

Table II also records a visual description of the original glass, a visual description of the gas-ceramic, various properties exhibited by the gas-ceramics, and crystal phases identified therein.

TABLE II

| Example | Glass Appearance | Heat Treatment °C.-hrs. | Gas-Ceramics Appearance, Properties, and Crystals |
|---|---|---|---|
| 1 | Transparent, some seeds, turquoise color | 750-2 800-4 | Transparent, turquoise color, grown seeds, mullite |
| 2 | Clear, some seeds and stones | 750-2 800-4 | Scattered bubbles, mullite |
| 3 | Clear, brown streaks, few seeds | 750-2 800-4 | <1 mm bubbles, ~10% by volume bubbles, some distortion |
| 4 | Clear, brown streaks, few seeds | 750-2 800-4 | Clear surface layer, ~10% by volume fine bubbles |
| 5 | Dark brown-to-black, streaky | 750-2 800-4 | Clear surface layer, ~10% by volume fine bubbles |
| 6 | Dark brown-to-black, streaky | 750-2 800-4 | ~20% by volume fine bubbles |
| 7 | Gray, swollen bubble area, patchy bottom nucleation | 700-12 | Glassy skin, ~15% by volume fine bubbles |
| 8 | Black with some area of brown translucent | 850-4 | Blue-gray, bubbles, ~50% by volume body expansion |
| 9 | Clear, pale gray | 800-4 | Fine gas-ceramic, streaky, ~30-40% by volume body expansion, 50-100 micron bubbles, mullite |
| 10 | Gray with fine bubbles on bottom | 800-4 | 25% linear, 20% vertical, and 40% by volume body expansion, glossy, mullite |
| 11 | Black streaks | 800-4 | 45% hydrogen bubbles, white, fine-grained |
| 12 | Black streaks | 800-4 | 50% hydrogen bubbles, white, fine-grained, density 1.28 g/cm³, 4400 psi MOR |
| 13 | Black-clear, cordy | 800-4 | 30% by volume body expansion, medium-grained |
| 14 | Bulged, fine glass-ceramic in middle | 800-4 | Fine-grained gas-ceramic |
| 15 | Largely black with light brown cord | 800-4 | 120% by volume body expansion, 60% hydrogen fine bubbles, mullite |
| 16 | Clear, pale brown | 800-4 | 130% by volume body expansion, floats on water, white, fine bubbles, $AlPO_4$ |
| 17 | Clear with dark cord | 950-4 | Clear with many blisters |
| 18 | Brown, black | 850-4 | Gray, fine-grain fracture, floats on water |
| 19 | Black with areas of brown translucence | 850-4 | Gray, medium bubbles, floats on water |
| 20 | Clear with brown streaks | 850-4 | Medium-coarse bubbles, blue-white, density 0.7 g/cm³ |
| 21 | Gray, light brown areas of transparency | 850-4 | Glossy skin, medium bubbles, density 1.1 g/cm³ |
| 22 | Seedy | 850-4 | Blisters and bubbles, |

TABLE II-continued

| Example | Glass Appearance | Heat Treatment °C.-hrs. | Gas-Ceramics Appearance, Properties, and Crystals |
|---|---|---|---|
| 23 | Clear, dark streaks | 950-4 | floats on water Clear with medium bubbles, ~10% by volume bubbles |
| 24 | Black, bands of translucency | 850-4 | White, fine bubbles, density 1.2 g/cm$^3$, 30% expansion thickness |

Table III lists several batched glass compositions, expressed in terms of parts by weight on the oxide basis, illustrative of compositions included within the $SiO_2$—$Al_2O_3(B_2O_3)$—$P_2O_5$—$Li_2O$—$[ZrO_2(TiO_2)]$ system. Inasmuch as the sum of the individual constituents of the base glass totals or closely approximates 100, for all practical purposes the value recited for each component may be deemed to reflect weight percent. Other than the hydrogen-forming ingredients, which are tabulated in excess of the base composition, the actual batch constituents may comprise any materials, either oxides or other compounds, which, when melted together, will be converted into the desired oxides in the proper proportions. Again, the volatile compounds $NH_3$ and starch are vaporized off to a great extent during glass formation.

The batches were compounded, ballmilled to assist in obtaining a homogeneous melt, and charged into silica crucibles. The crucibles were covered, introduced into a furnace operating at about 1500° C., and the batches melted for about 4 hours. The melts were cast into glass slabs having dimensions of about 8"×4"×0.375", and those slabs were annealed overnight at about 500° C.

TABLE III

|  | 25 | 26 | 27 | 28 |
|---|---|---|---|---|
| $SiO_2$ | 42.1 | 42.0 | 47.0 | 48.5 |
| $Al_2O_3$ | 29.3 | 25.0 | 20.0 | — |
| $B_2O_3$ | — | 10.0 | 10.0 | 31.0 |
| $Li_2O$ | 2.0 | 4.0 | 4.0 | 6.0 |
| $P_2O_5$ | 21.6 | 20.0 | 20.0 | 14.5 |
| MgO | 5.0 | — | — | — |
| $TiO_2$ | — | — | 5.0 | — |
| $ZrO_2$ | — | 5.0 | — | 3.0 |
| $NH_3$ | 5.3 | 4.9 | 4.9 | 3.5 |
| Starch | — | 1.0 | — | — |

Samples of proper configuration for use in conducting tests for various physical and chemical properties were cut from the slabs and those samples, along with the remainder of the slabs, were inserted into an electrically-heated furnace. In like manner to the glasses of Table I, the samples were heated at a rate of about 5° C./minute to the foaming temperature recorded in Table IV, maintained at that temperature for the period of time listed in Table IV, and thereafter cooled at furance rate.

Table IV also presents a visual description of the original glass, a visual description of the gas-ceramic, various properties exhibited by the gas-ceramics, and crystal phases identified therein.

TABLE IV

| Example | Glass Appearance | Heat Treatment °C.-hrs. | Gas-Ceramic Appearance, Properties & Crystals |
|---|---|---|---|
| 25 | Clear, seedy | 775-2 990-4 | Gray, ~15% by volume bubbles, fine-grained, β-quartz solid solution |
| 26 | Black with raised blisters | 750-4 | Blue, ~75% by volume bubbles, coarse-grained, floats on water |
| 27 | Dark blue | 850-4 | ~50% by volume coarse bubbles, blisters |
| 28 | Seedy, colorless | 850-4 | Clear, cherty fracture, ~50% by volume bubbles, blisters, β-quartz solid solution |

Table V records a variety of batched glass compositions, expressed in terms of parts by weight on the oxide basis, indicating compositions encompased within the $P_2O_5$—$SiO_2$—$B_2O_3$—[RO] system. Since the total of the individual constituents of the base glass equals or closely approaches 100, for all practical purposes the concentration listed for each component may be considered to comprise weight percent. Other than the hydrogen-forming ingredients, which are tabulated in excess of the base composition, the actual batch constituents may be any material, either the oxide or other compound, which, when melted together, will be converted into the desired oxide in the proper proportions. Yet again, most of the $NH_3$ is volatilized off during glass formation.

The batches were compounded, ballmilled to aid in achieving a homogeneous melt, and charged into silica crucibles. The crucibles were covered, introduced into a furnace operating at about 1600° C., and the batches melted for about 2 hours. The melts were cast into glass slabs having dimensions of about 8"×4"×0.25", and those slabs were annealed overnight at about 600° C.

TABLE V

|  | 29 | 30 | 31 | 32 | 33 | 34 | 35 | 36 | 37 | 38 | 39 | 40 |
|---|---|---|---|---|---|---|---|---|---|---|---|---|
| $SiO_2$ | 30.0 | 23.7 | 33.3 | 10.0 | 15.0 | 25.0 | 35.6 | 21.7 | 34.1 | 34.8 | 33.8 | 33.8 |
| $B_2O_3$ | 11.2 | 11.4 | 19.0 | 14.4 | 13.6 | 12.0 | 25.8 | 12.6 | 19.8 | 15.2 | 14.7 | 14.7 |
| MgO | 13.0 | — | — | 16.7 | 15.8 | 13.9 | — | 14.5 | 5.7 | 8.8 | 8.5 | — |
| CaO | — | 18.3 | 4.1 | — | — | — | — | — | — | — | — | — |
| $P_2O_5$ | 45.8 | 46.0 | 43.7 | 59.0 | 55.6 | 49.1 | 38.6 | 51.2 | 40.4 | 41.2 | 40.0 | 40.0 |
| $NH_3$ | 11.2 | 11.4 | 10.7 | 14.4 | 13.6 | 12.0 | 9.4 | 12.5 | 9.9 | 10.1 | 9.8 | 9.8 |
| ZnO | — | — | — | — | — | — | — | — | — | — | — | 11.5 |
| $Al_2O_3$ | — | — | — | — | — | — | — | — | — | — | 2.9 | — |

|  | 41 | 42 | 43 | 44 | 45 | 46 | 47 | 48 | 49 | 50 | 51 |
|---|---|---|---|---|---|---|---|---|---|---|---|
| $SiO_2$ | 40.0 | 39.0 | 41.1 | 40.8 | 37.3 | 50.5 | 52.8 | 53.4 | 56.1 | 58.0 | 59.4 |
| $B_2O_3$ | 13.9 | 13.6 | 14.3 | 9.5 | 17.3 | 11.0 | 11.5 | 15.4 | 9.8 | 6.7 | 17.2 |
| MgO | 2.7 | — | — | — | — | — | 4.4 | — | — | — | — |
| CaO | | | | | | | | | | | |
| $P_2O_5$ | 37.9 | 36.9 | 38.9 | 38.6 | 35.3 | 29.9 | 31.3 | 31.4 | 26.5 | 27.4 | 23.4 |
| $NH_3$ | 9.3 | 9.0 | 9.5 | 9.4 | 8.6 | 7.3 | 7.7 | 7.7 | 6.5 | 6.7 | 5.7 |
| ZnO | 5.4 | 10.6 | 5.6 | 11.1 | 10.1 | 8.6 | — | — | 7.6 | 7.9 | — |

TABLE V-continued $Al_2O_3$

Specimens of the proper shape for use in determining various physical and chemical properties were cut from the slabs and those specimens, along with the remainder of the slabs, except for Examples 32–34, were inserted into an electrically-heated furnace. Examples 29–31 and 35–42 were heated at a rate of about 5° C./minute to the foaming temperatures recorded in Table VI, held at that temperature for the period of time reported in Table VI, and then cooled at furnace rate. Examples 43–46 were heated at a rate of about 50° C./hour to the foaming temperature reported in Table VI, held thereat for the times specified in Table VI, and thereafter cooled at furnace rate. Examples 47–51 were heated at a rate of about 5° C./minute to about 800° C. and thereafter the samples were raised at about 50° C./hour to the foaming temperatures listed in Table VI, maintained at that temperature for the times recorded, and then cooled at furnace rate. Examples 32–34 spontaneously developed into gas-ceramics as the melts cooled to slabs.

Table VI also includes a visual description of the original glass, a visual description of the heat treated product, various properties exhibited by the heat treated product, and crystal phases identified therein. Several specimens were immersed into boiling water for 1–3 hours and their appearance examined thereafter. A rating of 1–5 was assigned; 1 indicating very little or no change and 5 reflecting severe attack.

TABLE VI

| Example | Glass Appearance | Heat Treatment °C.-hrs. | Heat Treated Product Appearance, Properties, & Crystals |
|---|---|---|---|
| 29 | White, translucent | 775-4 | White, deformed, density 0.6 g/cm³, fine-medium bubbles |
| 30 | White opal, waxy fracture | 775-4 | White, deformed, fine bubbles, density 0.7 g/cm³ |
| 31 | Clear, seedy | 775-4 | Medium-to-coarse bubbles, orange skin, density 0.8 g/cm³, floats on water |
| 32 | Spontaneous gas-ceramic | | Glassy skin, 300% by volume body expansion |
| 33 | Spontaneous gas-ceramic | | Glassy skin, 250% by volume body expansion |
| 34 | Spontaneous gas-ceramic | | Glassy skin, 400% by volume body expansion |
| 35 | Clear | 900-2 | Fine-grained, light orange, glossy skin, few large blisters, $BPO_4$ |
| 36 | Clear | 800-2 | Medium cells, uneven matte skin, 400% by volume body expansion, $Mg_2P_2O_7$ |
| 37 | Clear | 900-2 | Fine cells, glossy skin, 350% by volume body expansion, amorphous |
| 38 | Clear | 900-2 | Very fine bubbles, light pink, glossy skin, 300% by volume body expansion, amorphous, $H_2O$ test 5 |
| 39 | Translucent White | 900-2 | Coarse cells, white, matte skin, 400% by volume body expansion, $H_2O$ test 3 |
| 40 | Clear | 900-2 | Very fine cells, pink, glossy skin, 300% by volume body expansion, hygroscopic, amorphous |
| 41 | Clear | 900-2 | Very fine cells, ivory-white, glass skin, 300% by volume body expansion, amorphous, $H_2O$ test 2 |
| 42 | Clear | 900-2 | Very fine cells, ivory-white, glass skin, 300% by volume body expansion, amorphous, $H_2O$ test 2 |
| 43 | Clear | 900-2 | Extremely fine cells, orange, glass skin, 200% by volume body expansion, $H_2O$ test 1+ |
| 44 | Clear | 900-2 | Extremely fine cells, orange, glass skin, 200% by volume body expansion, $H_2O$ test 1+ |
| 45 | Clear | 900-2 | Very fine cells, ivory, glass skin, 300% by volume body expansion, amorphous, $H_2O$ test 5 |
| 46 | Clear | 900-2 | Very fine cells, ivory, glass skin, few glassy cords, 150% by volume body expansion, $H_2O$ test 1+ |
| 47 | Clear | 950-2 | Very fine-celled, ivory-white with smooth, glassy skin, 300% by volume body expansion, $H_2O$ test 2 |
| 48 | Clear | 1000-1 | Fine-celled, salmon pink foam with glassy skin, very few small blisters, 150% by volume body expansion, $H_2O$ test 1 |
| 49 | Clear | 950-2 | Very fine-celled light orange foam with smooth glassy skin, 300% by volume body expansion, $H_2O$ test 1 |
| 50 | Clear | 950-2 | Very fine-celled light orange foam with smooth glassy skin, 200% by volume body expansion, $H_2O$ test 1 |
| 51 | Clear | 1000-1 | Very fine-celled white foam with white opal glass skin, 200% by volume body expansion, $H_2O$ test 1 |

Table VII illustrates that the density of the inventive products decreases with heat treatment, corresponding to an increase in cell volume and cell diameter.

TABLE VII

| | Example No. 42 | |
|---|---|---|
| Heat Treatment | Density (g/cm³) | Cell Diameter (microns) |
| None | 2.40 | — |
| 5° C./min. to 850° C.-hold 2 hrs. | 1.64 | 5 |
| 5° C./min. to 900° C.-hold 2 hrs. | 1.10 | 20 |
| 5° C./min. to 950° C.-hold 2 hrs. | 1.04 | 50 |

Table VIII records the results of mass spectrometry bubble analyses on several foam compositions in terms of mole percent.

TABLE VIII

| Example | Hydrogen | Nitrogen |
|---------|----------|----------|
| 3  | 98.7% | 1.3% |
| 12 | 95.9% | 4.1% |
| 17 | 98+%  | —    |
| 26 | 98.7% | 1.3% |
| 33 | 99.3% | 0.7% |

We claim:

1. Hydrogen-containing glass microfoams having glassy skins selected from the system $SiO_2$—$Al_2O_3$—$B_2O_3$—RO—$R_2O$ consisting essentially, expressed in weight percent on the oxide basis, of:

| $SiO_2$   | 25-65 | RO         | 0-15    |
|-----------|-------|------------|---------|
| $Al_2O_3$ | 15-35 | $R_2O$     | 0-20    |
| $B_2O_3$  | 12-35 | RO + $R_2O$ | 1.5-20 |
| $P_2O_5$  | 0-10  |            |         | wherein RO is selected from the group of MgO, CaO, SrO, BaO, and ZnO, and $R_2O$ is selected from the group of alkali metal oxides.

2. Hydrogen-containing glass microfoams selected from the system $SiO_2$—$Al_2O_3(B_2O_3)$—$P_2O_5$—$Li_2O$—[$ZrO_2(TiO_2)$] consisting essentially, expressed in weight percent on the oxide basis, of:

| $SiO_2$   | 40-50 | $ZrO_2$  | 0-10 |
|-----------|-------|----------|------|
| $Al_2O_3$ | 15-35 | $B_2O_3$ | 0-15 |
| $P_2O_5$  | 10-25 | $TiO_2$  | 0-5  |
| $Li_2O$   | 1-7.  |          |      |

3. Hydrogen-containing glass microfoams having glassy skins selected from the system $SiO_2$—$B_2O_3$—$P_2O_5$—[RO] consisting essentially, expressed in weight percent on the oxide basis, of 10-65% $SiO_2$, 5-25% $B_2O_3$, and 15-60% $P_2O_5$.

4. Hydrogen-containing glass microfoams according to claim 3 also containing 0.5-10% MgO+CaO+ZnO consisting of 0-5% MgO, 0-5% CaO, and 0-10% ZnO.

5. Hydrogen-containing glass microfoams according to claim 3 consisting essentially, expressed in weight percent on the oxide basis, of 40-60% $SiO_2$, 7-20% $B_2O_3$, and 20-35% $P_2O_5$.

6. Hydrogen-containing glass microfoams according to claim 5 also containing 0.5-10% MgO+CaO+ZnO consisting of 0-5% MgO, 0-5% CaO, and 0-10% ZnO.

7. Hydrogen-containing gas ceramics having glassy skins selected from the system $SiO_2$—$Al_2O_3$—$B_2O_3$—RO—$R_2O$ consisting essentially, expressed in weight percent on the oxide basis, of:

| $SiO_2$   | 25-65 | RO         | 0-15    |
|-----------|-------|------------|---------|
| $Al_2O_3$ | 15-35 | $R_2O$     | 0-20    |
| $B_2O_3$  | 12-35 | RO + $R_2O$ | 1.5-20 |
| $P_2O_5$  | 0-10  |            |         | wherein RO is selected from the group of MgO, CaO, SrO, BaO, and ZnO, and $R_2O$ is selected from the group of alkali metal oxides.

8. Hydrogen-containing gas-ceramics selected from the system $SiO_2$—$Al_2O_3(B_2O_3)$—$P_2O_5$—$Li_2O$—[$ZrO_2(TiO_2)$] consisting essentially, expressed in weight percent on the oxide basis, of:

| $SiO_2$   | 40-50 | $ZrO_2$  | 0-10 |
|-----------|-------|----------|------|
| $Al_2O_3$ | 15-35 | $B_2O_3$ | 0-15 |
| $P_2O_5$  | 10-25 | $TiO_2$  | 0-5  |
| $Li_2O$   | 1-7.  |          |      |

9. Hydrogen-containing gas-ceramics having glassy skins selected from the system $SiO_2$—$B_2O_3$—$P_2O_5$—[RO] consisting essentially, expressed in weight percent on the oxide basis, of 10-65% $SiO_2$, 5-25% $B_2O_3$, and 15-60% $P_2O_5$.

10. Hydrogen-containing gas-ceramics according to claim 9 also containing 0.5-10% MgO+CaO+ZnO consisting of 0-5% MgO, 0-5% CaO, and 0-10% ZnO.

11. Hydrogen-containing gas-ceramics according to claim 9 consisting essentially, expressed in weight percent on the oxide basis, of 40-60% $SiO_2$, 7-20% $B_2O_3$, and 20-35% $P_2O_5$.

12. Hydrogen-containing gas-ceramics according to claim 11 also containing 0.5-10% MgO+CaO+ZnO consisting of 0-5% MgO, 0-5% CaO, and 0-10% ZnO.

* * * * *